United States Patent [19]

Peters

[11] Patent Number: 4,481,989

[45] Date of Patent: Nov. 13, 1984

[54] TREE STUMP EXTRACTOR

[75] Inventor: Edwin L. Peters, Blountstown, Fla.

[73] Assignee: Reichhold Chemicals, Inc., White Plains, N.Y.

[21] Appl. No.: 533,535

[22] Filed: Sep. 20, 1983

[51] Int. Cl.³ .......................................... A01G 23/06
[52] U.S. Cl. .................................... 144/335; 37/2 R; 144/2 N; 144/34 E; 144/367
[58] Field of Search .............. 144/2 N, 34 R, 34 E, 144/335, 339, 367, 3 R; 37/2 R

[56] References Cited

U.S. PATENT DOCUMENTS

| 3,739,823 | 6/1973 | Bartell | 144/2 N |
| 3,989,075 | 11/1976 | Coughran, Jr. | 144/2 N |
| 4,067,369 | 1/1978 | Harmon | 144/2 N |
| 4,141,398 | 2/1979 | Widegren et al. | 144/2 N |

FOREIGN PATENT DOCUMENTS

| 784836 | 12/1980 | U.S.S.R. | 144/2 N |
| 897167 | 1/1982 | U.S.S.R. | 144/2 N |

Primary Examiner—W. D. Bray
Attorney, Agent, or Firm—Rodman & Rodman

[57] ABSTRACT

The apparatus for extracting a tree stump from the ground without the root has a frame including locating means for locating the frame in a predetermined central position on a tree stump. Shearing means oppositely disposed on the frame are pivotable toward each other to cut the tap root of the tree stump in a lateral direction at a predetermined distance below the ground level. The shearing means are pivotable by a first set of hydraulic cylinders and also receive additional movement from a thrust member that moves longitudinally with respect to the frame and engages the shearing members during such longitudinal movement. The thrust member also includes an annular cutter portion for cutting the lateral root of the tree stump substantially simultaneously as the shearing members cut the tap root. In one embodiment of the invention the cutter blades of the shearing members are placed next to each other in substantially continuous line to line contact after total shearing of the tap root of the tree stump. In a further embodiment of the invention the cutter blades each have recesses so that the tree stump is gripped rather than sheared. The latter embodiment permits removal of the tap root portion with the tree stump, while the lateral root portion is cut to remain in the ground.

37 Claims, 10 Drawing Figures

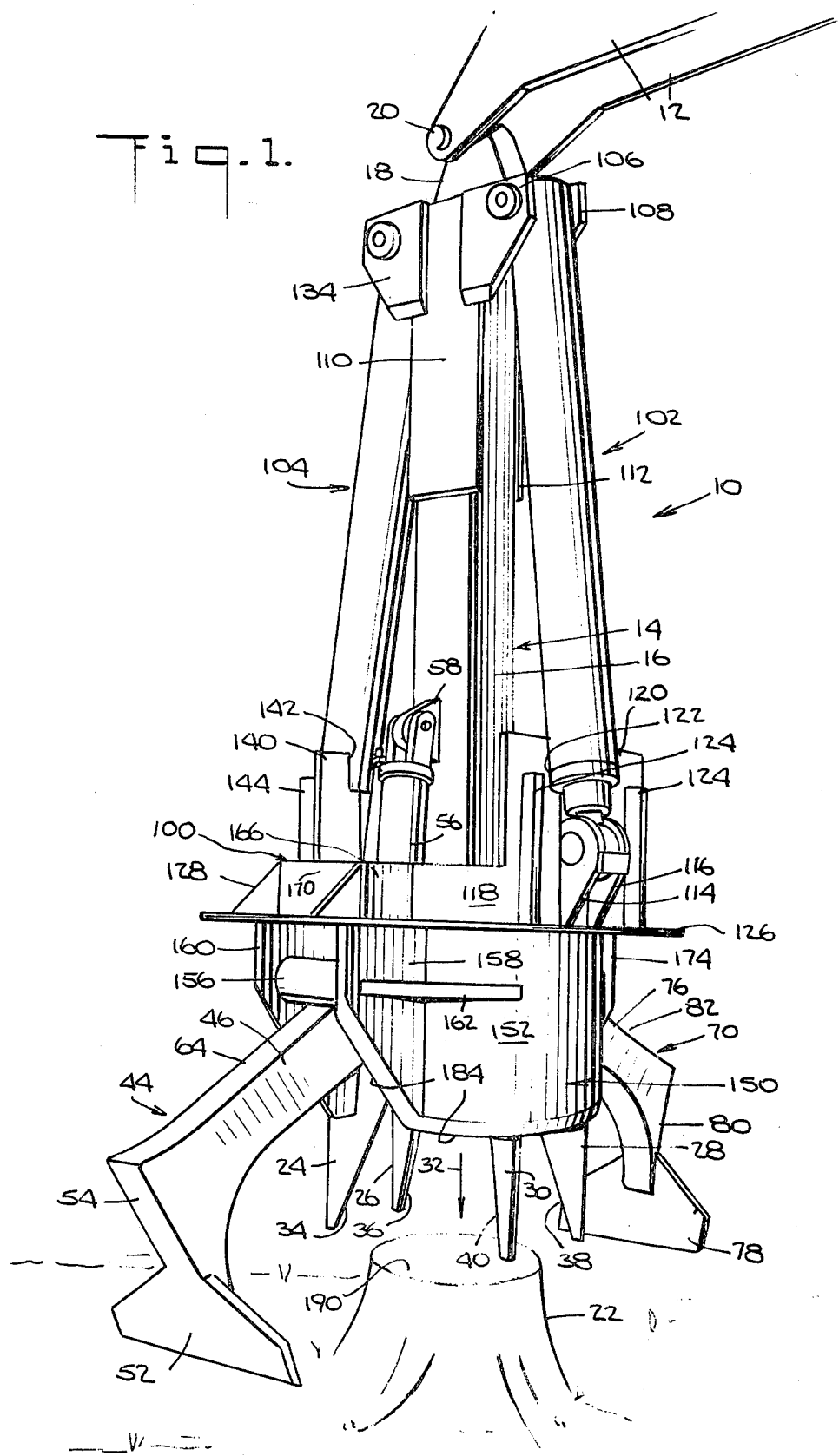

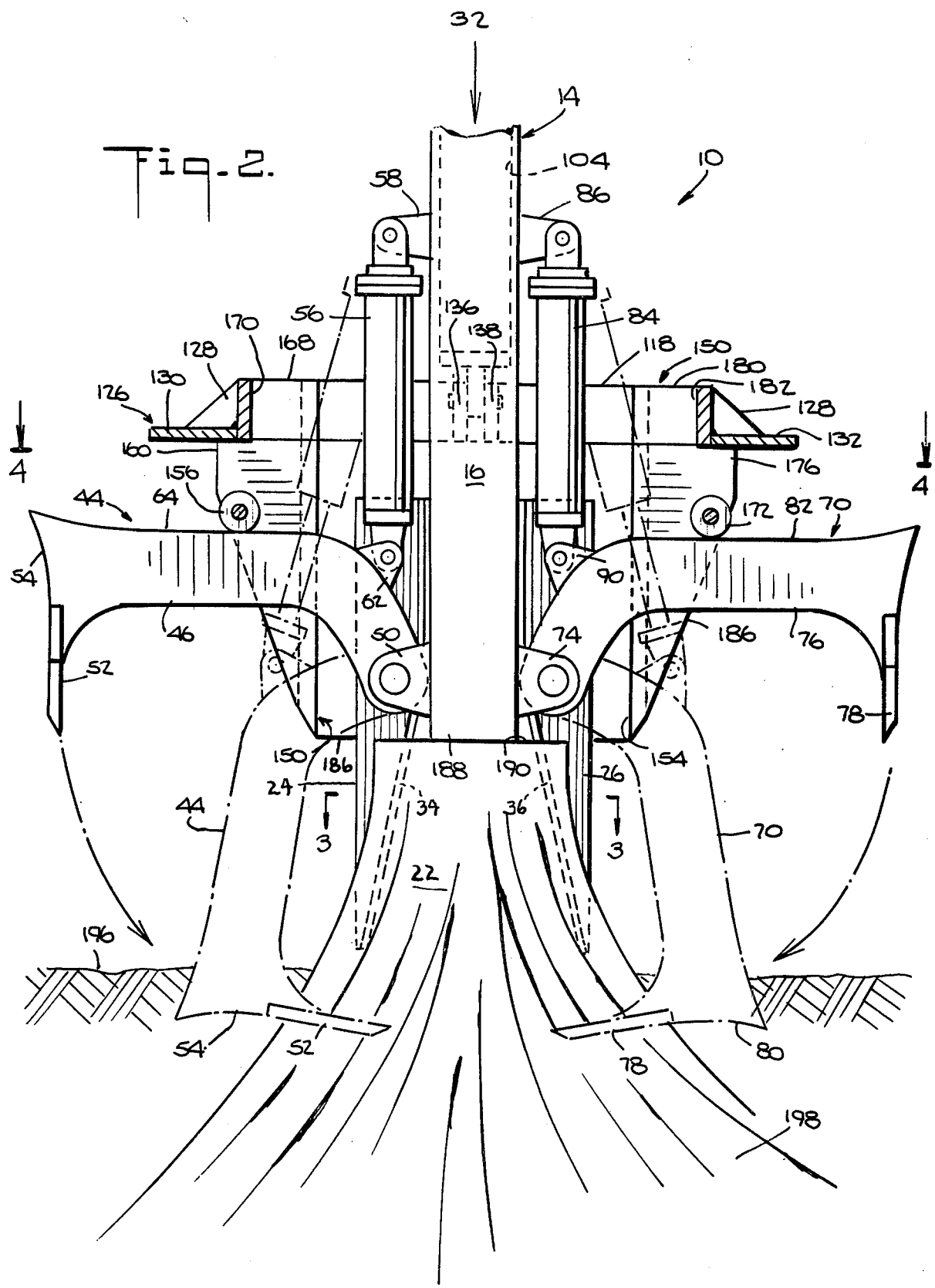

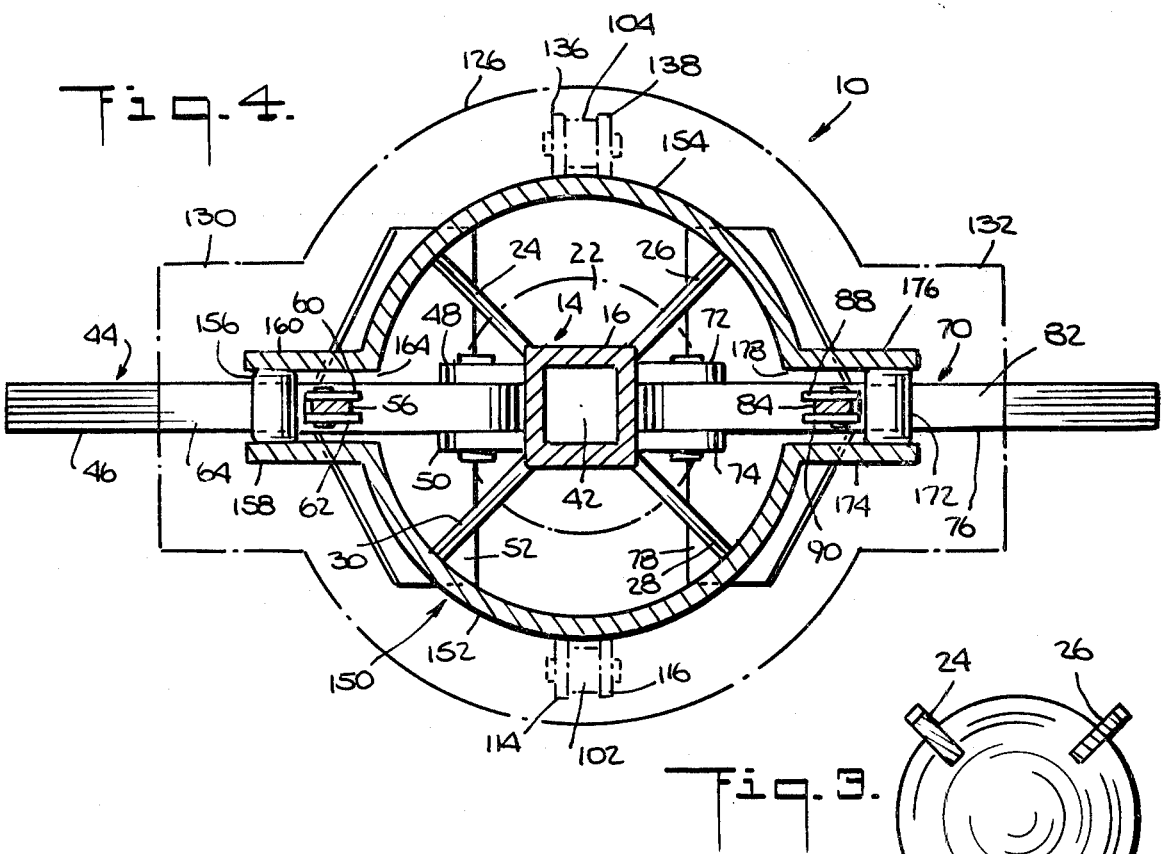
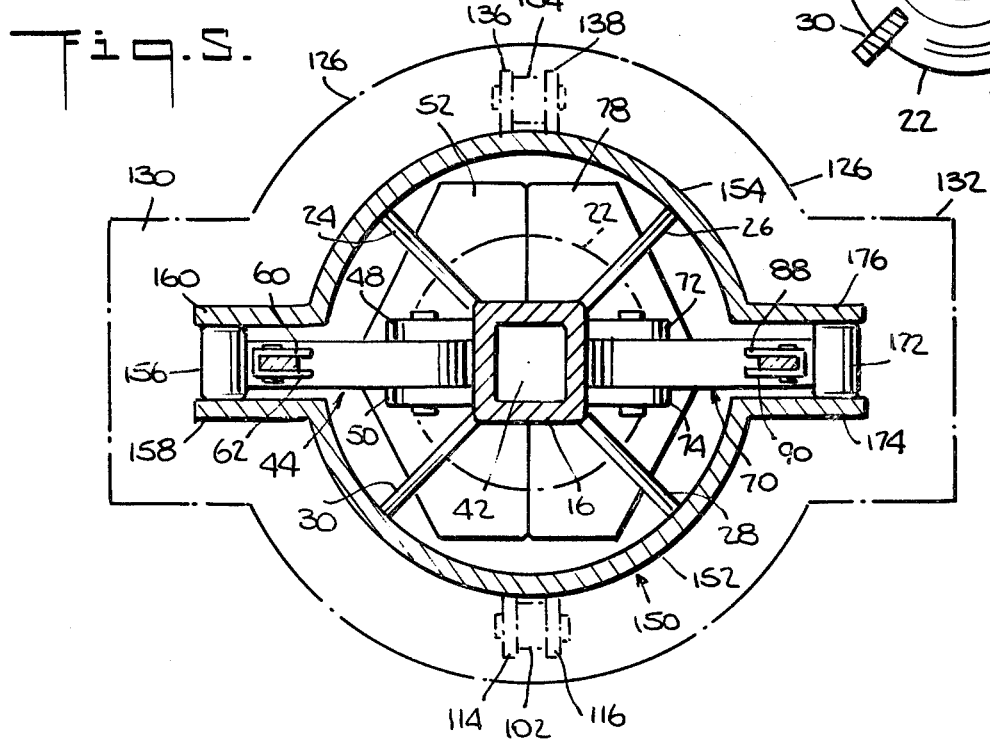

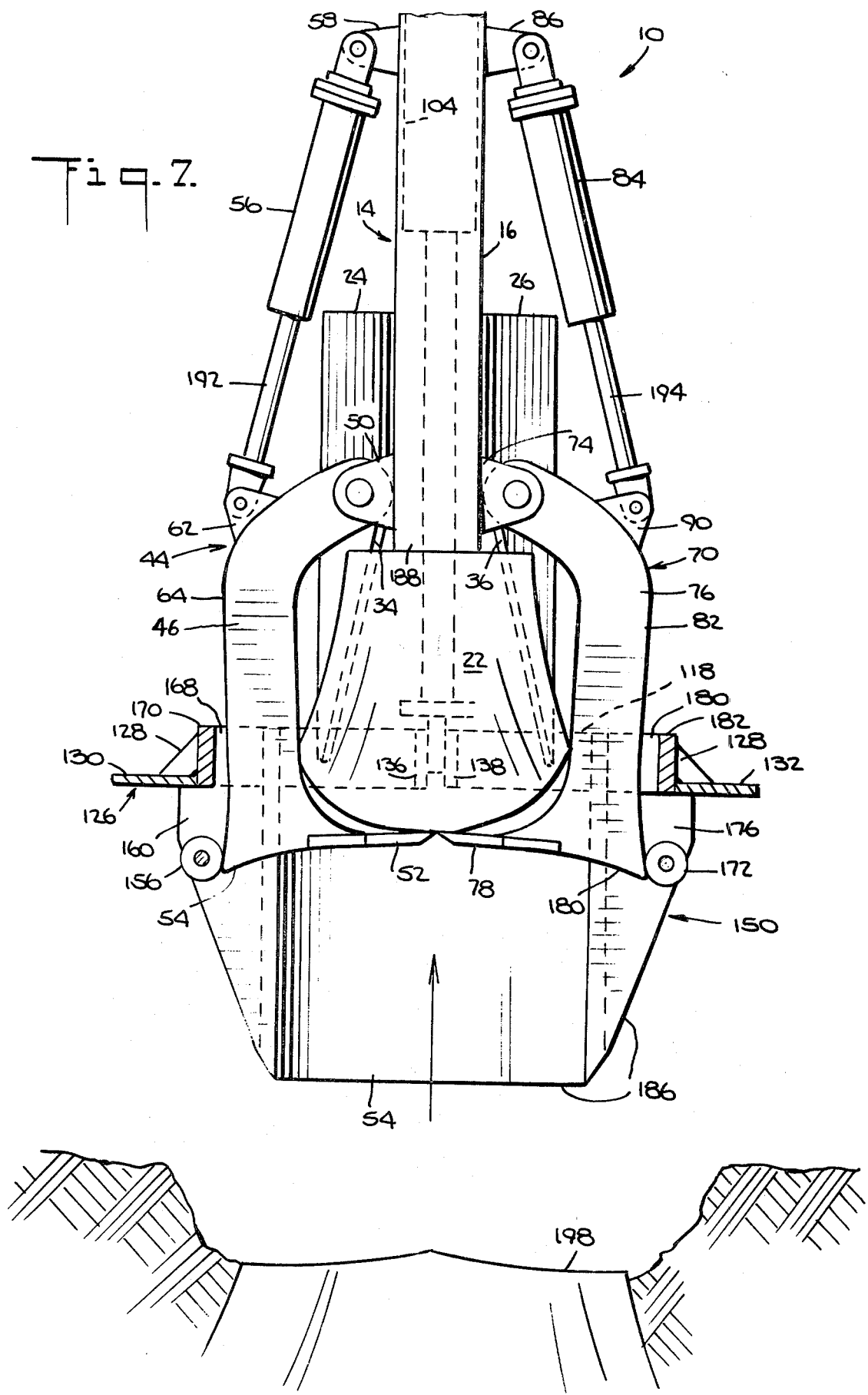

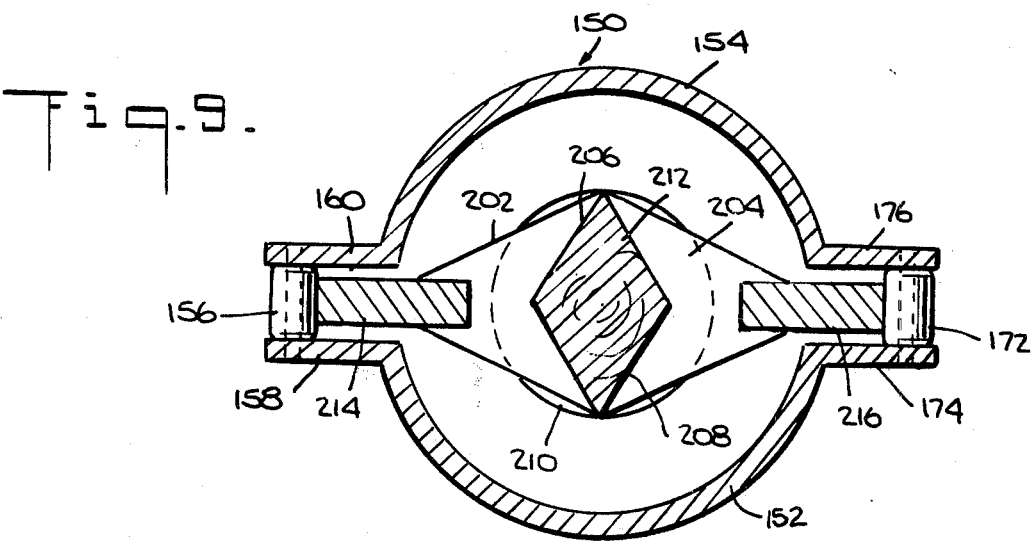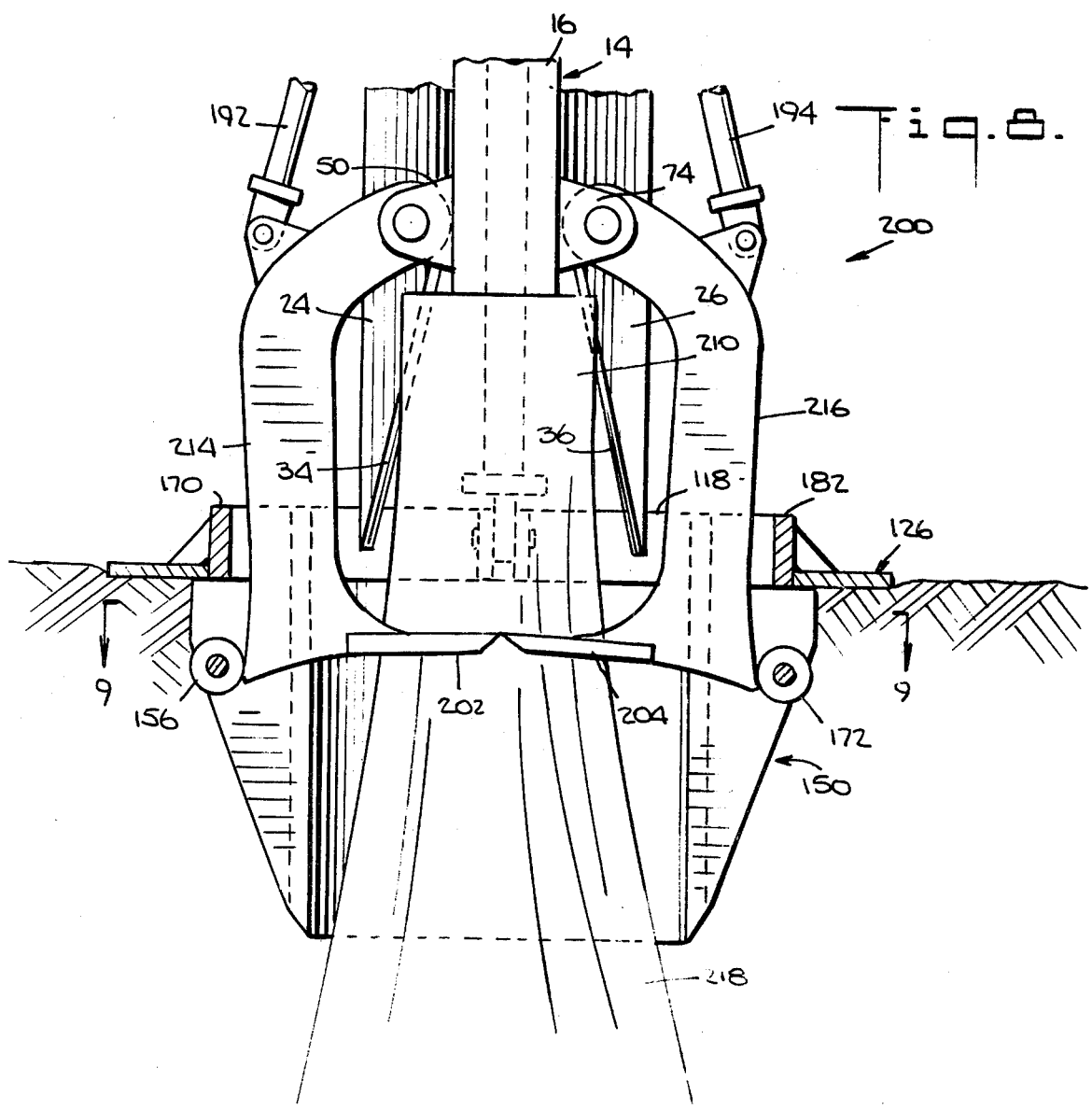

TREE STUMP EXTRACTOR

BACKGROUND OF THE INVENTION

This invention relates to tree cutting equipment, and more particularly to an apparatus for extracting a portion of a tree stump from the ground after the main trunk portion or stem of the tree has been removed.

Trees, such as various species of pine, that are grown for industrial purposes including lumber and pulp, are usually cut after a predetermined growth cycle of 20 to 30 years, for example. Some time prior to harvesting of the pine tree a chemical additive can be injected or otherwise furnished to the tree to facilitate the removal operation.

Generally the trunk or stem of the tree is cut a predetermined height from the ground leaving behind the root of the tree and a tree stump of predetermined size. The root of the pine tree includes a tap root portion which extends directly into the ground and a lateral root portion with root branches that extend laterally away from the trunk in all directions.

It is well known that a pine tree contains oleoresin, a crude gum from which turpentine and rosin, also known as naval stores, are derived. The oleoresin has its greatest concentration in the stump of the tree at a section known as the watermelon portion. The watermelon portion is the section of the stump that extends from the point at which the tree has been sheared down to the ground level, but does not include the lateral root portion or the tap root portion.

Generally the watermelon portion is approximately 30 inches in length, whereas the tap root extends approximately 5 feet into the ground and the lateral root, although shallower than the tap root has a relatively broad swath.

In order to extract the oleoresin from the stump it is customary to remove the stump from the ground for chopping or grinding into chips and eventually shreds that are of matchstick size. The shreds are then further processed to extract the oleoresin.

Although the roots of the stump are not desired for the extraction of oleoresin it is common practice to harvest the stump by pulling it out of the ground with the entire root. Consequently a large amount of earth is brought up during the stump removal operation resulting in the formation of an unsightly and environmentally undesirable cavity at the site of the removed stump. Such cavity must be filled in or the ground otherwise restored to a condition suitable for tree replanting. The ground restoration operation is tedious, messy and time consuming, and also significantly adds to the cost of the stump removal.

Because the root of the tree creates more problems out of the ground than in the ground it would be beneficial to remove the watermelon portion of the tree stump without removing the root. However thus far there is no known apparatus which will feasibly remove only the watermelon portion of the tree stump from the ground while leaving the root behind.

It is thus desirable to provide an apparatus for extracting the watermelon portion of a tree stump from the ground without removing the root.

Unless otherwise indicated the term tree stump as hereinafter used is intended to refer to the watermelon portion of the tree stump.

OBJECTS AND SUMMARY OF THE INVENTION

Among the several objects of the invention may be noted the provision of a novel apparatus for extracting a tree stump from the ground, a novel apparatus for extracting a tree stump from the ground without removing the root from the ground, a novel apparatus for cutting a tree stump a predetermined depth below ground level, a novel apparatus for substantially simultaneously cutting the lateral root portion and the tap root portion of the tree stump in the ground to permit extraction of the tree stump from the ground without the root, a novel apparatus for extracting a tree stump from the ground which furnishes an increasing moment to a shearing member as the shearing member moves to a shearing limit position, and a novel apparatus for extracting a tree stump from the ground which furnishes cumulative forces on a shearing member to enhance the shearing capability of such member.

Other objects and features of the invention will be in part apparent and in part pointed out hereinafter.

The present invention relates to an apparatus for extracting a tree stump from the ground. In a preferred embodiment of the invention the apparatus is adapted to remove the tree stump from the ground without removing the lateral or tap root portions from the ground.

The extractor includes a frame with locating means for centering the frame relative to the tree stump. Once the frame has been centered all portions of the extractor directly or indirectly connected to the frame are substantially centered relative to the tree stump.

The extractor further includes oppositely disposed shearing members that pivot with respect to the frame. The shearing members have a laterally extended first limit position relative to the frame and a confronting second limit position wherein respective cutter portions of the shearing members are disposed next to each other after the tap root has been sheared from the tree stump.

The extractor also includes a thrust means that is moveable in a longitudinal direction relative to the frame for engagement with the shearing members to urge the shearing members into their second limit position. The thrust means also includes an annular cutter that cuts the lateral root portion in a longitudinal direction while cooperating with the shearing members to influence shearing of the tap root at a predetermined depth below ground level.

The tree stump is thus sheared away from the tap root and lateral root while the roots remain in the ground. The sheared stump is of predetermined size that permits it to be cradled within the extractor for delivery to a desired location.

The tap root and lateral root portions that are left in the ground will gradually deteriorate over a period of time and their presence in the ground does not deleteriously effect the tree replanting operation. Furthermore any chemicals that are added to the tree to facilitate the harvesting thereof have a predetermined concentration that has no adverse effect at the root area.

In another embodiment of the invention the shearing member cutter portions are provided with recesses that prevent the tap root of the tree stump from being completely sheared. The cutter portions thus grip the tree stump with substantial force rather than shear it completely to permit extraction of the tree stump along with the tap root. However the annular cutter cuts away the lateral roots, as in the preferred embodiment, leaving them in the ground while the tree stump is extracted from the ground.

In either embodiment of the invention the extracted tree stump is released from the extractor when the shearing members are repositioned in their first limit position and the thrust means is placed in an ascended limit position.

The invention accordingly comprises the constructions hereinafter defined, the scope of the invention being indicated in the following claims.

DESCRIPTION OF THE DRAWINGS

In the accompanying drawings, in which various possible embodiments of the invention are illustrated, FIG. 1 is a perspective view of a tree stump extractor incorporating one embodiment of the present invention, the extractor being positioned over a tree stump prior to extraction thereof;

FIG. 2 is a front elevational view thereof as positioned on the tree stump;

FIG. 3 is a sectional view taken along the line 3—3 of FIG. 2;

FIG. 4 is a sectional view thereof just prior to shearing of the tree stump;

FIG. 5 is a view similar to FIG. 4 after the tree stump has been sheared;

FIG. 7 is a front elevational view thereof after the tree stump has been removed from the ground;

FIG. 8 is a front elevational view of another embodiment of the invention;

FIG. 9 is a sectional view taken along the line 9—9 of FIG. 8;

Corresponding reference characters indicate corresponding parts throughout the several views of the drawings.

DETAILED DESCRIPTION OF THE INVENTION

Figure 6:
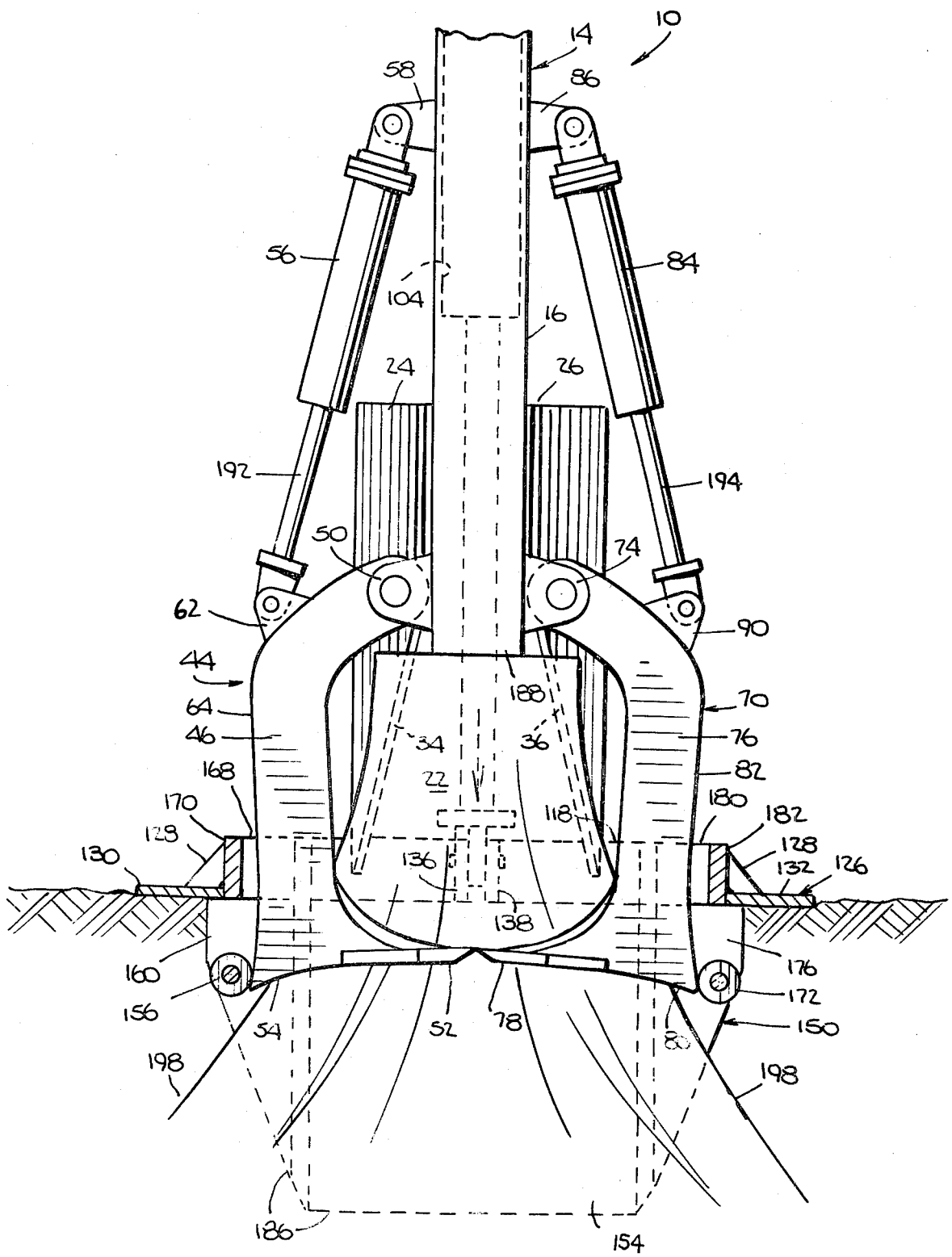
FIG. 6 is a front elevational view thereof after the tree stump has been sheared.

Referring to the drawings, a tree stump extractor is generally indicated by the reference number 10 in FIG. 1.

The tree stump extractor 10, hereinafter referred to as the extractor 10, is moved about by means of any suitable known device capable of raising and lowering the extractor 10, such as a derrick schematically represented by the derrick arms 12 in FIG. 1.

The extractor 10 comprises an elongated frame 14 formed of a hollow column or post 16 having a generally rectangular cross section. The frame 14, which also functions as a support member, includes an ear portion 18 extending from one end of the column 16 for pivotal connection to the derrick arms 12 by a pin 20. Locating means for centering the extractor 10 on a tree stump 22 include a plurality of spline members 24, 26, 28 and 30 welded, or otherwise affixed to corner portions of the column 16. The spline members 24, 26, 28 and 30 project laterally away from the periphery of the column 16 and extend longitudinally downward of the column 16 in the direction indicated by the arrow 32 of FIGS. 1 and 2. The spline members 24, 26, 28 and 30 are formed with respective tapered surfaces 34, 36, 38 and 40 that diverge away from the column 16 in the downward longitudinal direction 32. The spline members 24, 28 and 26, 30 are characterized as opposite cooperative pairs, being located at opposite corners of the column 16. The tapered surfaces 34, 38 and 36, 40 of the cooperative pairs of spline members 24, 28 and 26, 30 have common vertices which originate at a single point lying along an axis 42 (FIGS. 4 and 5) of the column 16. Thus the extractor 10 is substantially centered with respect to the tree stump 22 when the tree stump 22 is straddled between the tapered surfaces 34, 36, 38 and 40 of the splines 24, 26, 28 and 30.

A shearing member 44 comprises an arm portion 46 pivoted to the column 16 between ears 48 and 50 located intermediate the spline members 24 and 30. The shearing member 44 also includes a wing-like shear blade or cutting surface 52 formed or affixed at a free end portion 54 of the arm 46. A double acting hydraulic cylinder 56 of any suitable known construction has one end pivoted to an ear 58 of the column 16 and an opposite end pivoted between ears 60 and 62 (FIG. 4) on the arm portion 46 of the shearing member 44. The cylinder 56, which can have a 20 inch stroke, a 5 inch bore and an inlet pressure of 1600 psig, thus pivots the shearing member 44 relative to the column 16. A cam engagement surface 64 is defined on the arm portion 46 intermediate the ears 60, 62 and the free end portion 54.

A shearing member 70, symmetrical to the shearing member 44, is pivoted to the column 16 opposite the shearing member 44, between ears 72 and 74. The shearing member 70 includes an arm portion 76, a cutting surface 78, a free end portion 80 and a cam engagement surface 82 corresponding to the arm portion 46, the cutting surface 52, the free end portion 54 and the cam engagement surface 64 of the shearing member 44. A double acting hydraulic cylinder 84, correspondingly identical to the cylinder 56, has one end pivoted to an ear 86 on the column 16 and an opposite end pivoted between ears 88 and 90 on the arm portion 76 of the shearing member 70. The cylinder 84 thus pivots the shearing member 70 relative to the column 16.

An annularly shaped thrust means 100 for forcing the shearing members 44 and 70 to pivot toward each other is suspended from the frame 14 by a pair of oppositely disposed double acting hydraulic cylinders 102 and 104. The cylinders 102 and 104, which are identical, are symmetrically mounted to the frame 14 and the thrust means 100. For example, one end of the cylinder 102 is pivoted between ears 106 and 108 that are welded or otherwise secured to the column 16. If desired, reinforcement plates 110 and 112 can be respectively provided between the column 16 and ears 106 and 108.

An opposite end of the hydraulic cylinder 102 is pivoted between ears 114 and 116 that extend from an upper collar portion 118 of the thrust means 100. The upper collar portion 118 includes a projecting shoulder portion 120 that borders the ears 114 and 116. The shoulder portion 120 includes a cut-out clearance portion 122 for the cylinder 102. Spaced reinforcement pieces 124, 124 are provided in the shoulder portion 120 and butt against an annular flange 126 projecting laterally from the upper collar 118. Reinforcement webs 128 are spaced along the surface of the annular flange 126 around the periphery of the upper collar portion 118. The flange 126 also includes oppositely disposed lateral extensions 130 and 132 approximately 90 degrees away from the ears 114, 116 and 136, 138, as seen most clearly in FIGS. 4 and 5.

The upper end of the cylinder 104 is pivoted to the frame 14 between ears such as 134 (FIG. 1) that correspond to the ears 106 and 108. The opposite end of the cylinder 104 is pivoted between ears 136 and 138 (FIGS. 4 and 5) that are bordered by a shoulder portion 140 (FIG. 1) having a cut out 142 and reinforcement pieces 144, 144 in correspondency with the ears 114, 116, the shoulder portion 120, the cut out 122 and the reinforcement pieces 124 associated with the hydraulic cylinder 102. The hydraulic cylinders 102 and 104, which can have a 42 inch stroke, an 8 inch bore and an inlet pressure of 1800 psig, thus suspend the thrust means 100 such that the thrust means 100 and the frame 14 are substantially coaxial at the axis 42.

A substantially annular cutter portion 150 has annular segments 152 and 154 depending below the flange 126. The annular segments 152 and 154 are extensions of the upper collar portion 118. A thrust roller 156 is rotatably supported on a fixed axis between side walls 158 and 160 that project laterally from the annular segments 152 and 154. A lateral reinforcement 162 is provided between the annular segment 152 and the side wall 158. Similar reinforcements are provided at similar locations around the annular cutter 150.

The side walls 158 and 160 define a clearance slot 164 (FIGS. 4 and 5) in the cutter portion 150 for the shearing member 44 which is engaged by the roller 156. The clearance slot 164 continues into the collar portion 118 whereas side walls 166 and 168 at the collar portion 118 are narrower continuations of the side walls 158 and 160. A front wall 170 joins the side walls 166 and 168 (FIG. 2).

A thrust roller 172, disposed opposite the thrust roller 156 for engagement with the shearing member 70 is rotatably supported between side walls 174 and 176 on the segments 152 and 154. The side walls 174 and 176 define a clearance slot 178 which continues in the collar portion 118, and side walls such as 180 (FIG. 2) at the collar portion 118 correspond to the side walls 166, 168 and are a narrower continuation of the side walls 174 and 176. A front wall 182 joins the side walls such as 180 such that the support structure for the thrust roller 172 symmetrically corresponds to the structure supporting the thrust roller 156.

A root cutting edge 184 is formed at the free end of the segment 152 and extends along a tapered portion of the side walls 158 and 174, which taper can be approximately 45 degrees. A similar root cutting edge 186 is formed at the free end of the segment 154 and extends along a similarly tapered portion of the side walls 160 and 176.

In operation of the extractor 10 the derrick arms 12 position the extractor 10 over the tree stump 22, which can be the stump of a pine tree for example. Generally a pine tree trunk will be cut at a distance of approximately 30 inches from the ground level and the extractor is sized to accommodate such a tree stump.

During positioning of the extractor 10 on the tree stump 22, the hydraulic cylinders 56 and 84 are fully retracted to maintain the respective shearing members 44 and 70 in a first limit position as shown in solid lines in FIG. 2. Thus the shearing arms 44 and 70 are directed laterally outward relative to the frame 14 while disposed in the first limit position. Also, prior to location of the extractor 10 on the tree stump 22 the hydraulic cylinders 102 and 104 are fully retracted to maintain the thrust means 100, which includes the upper collar portion 118 and the annular cutter portion 150, in an ascended limit position relative to the frame 14 as shown in FIG. 2.

The extractor 10 is located on the tree stump 22 by aligning the spline members 24, 26, 28 and 30 with the periphery of the tree stump 22 such as shown in FIG. 1. The derrick arms 12 then lower the extractor 10 onto the tree stump 22 such that the tapered surfaces 34, 36, 38 and 40 of the spline members 24, 26, 28 and 30 engage the periphery of the tree stump 22. The derrick then forces the arms 12 in a downward direction such that the column 16 of the frame 14 moves downwardly against the tree stump in the direction indicated by the arrow 32 of FIGS. 1 and 2.

The derrick exerts a downward force against the column 16 of the frame 14 thereby forcing the tapered surfaces 34, 36, 38 and 40 of the spline members 24, 26, 28 and 30 to squeeze into the periphery of the tree stump 22 as the extractor 10 descends onto the tree stump. Preferably the extractor 10 is forced to descend to a position wherein a lower free end portion 188 of the column 16 engages a lateral surface 190 of the tree stump 22.

Once the extractor 10 is located on the tree stump 22 in the manner indicated, the column 16 is substantially centered relative to the tree stump. Thus the axis 42 of the column 16 is substantially coaxial with the axis of the tree stump. Furthermore, the thrust means 100 is substantially coaxial with the column 16 and is likewise centered relative to the tree stump 22 when the extractor 10 is located by the spline members 24, 26, 28 and 30 on the tree stump 22.

The hydraulic cylinders 56 and 84 are actuated to move the shearing members 44 and 70 from their first limit position, as shown in solid lines in FIG. 2, toward the second limit position by protracting the respective piston rods 192 and 194 (FIG. 6). It should be noted that the hydraulic lines for all of the cylinders have been omitted for the sake of clarity, and the controls for such cylinders are conventional.

The cutting surfaces 52 and 78 of the respective shearing arms 44 and 70 in moving toward the second limit position penetrate the ground surface 196 and cut into the tap root portion of the tree stump 22. However the mechanical advantage provided by the cylinders 56 and 84 is insufficient to cause the shearing members 44 and 60 to completely shear the tap root of the tree stump 22.

The shearing arms 44 and 70 are thus further acted upon by the thrust means 100 which is caused to move from an ascended limit position as shown in FIG. 2 toward a descended limit position as shown in FIG. 6. Movement of the thrust means 100 is actuated by the hydraulic cylinders 102 and 104 such that the respective piston rods in each of the cylinders 102 and 104 protract and thereby force the thrust means 100 to descend relative to the frame 14 in a direction substantially parallel to the direction arrow 32. Sufficient clearance is provided between the spline members 24, 26, 28 and 30, and the upper collar portion 118 and the annular cutter portion 150 such that the thrust means 100 is freely moveable with respect to the spline members 24, 26, 28 and 30. It should be noted that the hydraulic cylinders 102 and 104 are operated simultaneously so that there is no skewing of the thrust means relative to the axis 42.

As the thrust means 100 moves toward its descended limit position as shown in FIG. 6, the thrust rollers 156 and 172 engage the respective cam surfaces 64 and 82 of the shearing members 44 and 70 to pivot the shearing members 44 and 70 toward each other in the directions shown in FIG. 2. The mechanical advantage provided by the thrust rollers 156 and 172 on the arm portions 46 and 76 of the shearing members 44 and 70 is much greater than the mechanical advantage furnished by the hydraulic cylinders 56 and 84 since the thrust rollers 156 and 172 operate at increasing distances from the pivot ears 48, 50 of the shearing arm 44 and the pivot ears 72, 74 of the shearing member 70. Consequently, the force provided by the hydraulic cylinders 102 and 104 on the shearing arms 46 and 76 has a much greater mechanical advantage than that provided by the hydraulic cylinders 56 and 84. Furthermore, the forces provided by the hydraulic cylinders 56 and 84, and 102 and 104 on the shearing arms 46 and 76 are cumulative.

The cutter portions 52 and 78 are thus enabled to laterally shear the tap root of the tree stump 22 in the manner shown in FIG. 6 while the cutting edges 184 and 186 of the annular cutter portion 150 shear the lateral root portion 198 (FIG. 6) of the tree stump 22 in a longitudinal direction.

As shown in FIG. 5, the cutting surfaces 52 and 78 are in substantially line to line contact when the shearing of the tap root has been completed.

The particular dimensions of the extractor 10 are a matter of choice but should be selected such that the lateral cutting of the tree stump 22 takes place slightly below the ground surface 196. It is adequate for the annular cutter portion 152 to penetrate approximately 12 inches below the ground surface 196. The annular flange 126 will help limit the descent of the annular cutter portion below the ground surface 196 by bearing against the ground surface 196 when the annular cutter portion 150 has entered the earth a predetermined amount.

It will be apparent to those skilled in the art that the relative dimensions of the extractor 10 can be selected so that shearing of the tree stump 22 will take place above the ground surface 196. However since the watermelon portion extends slightly below ground it is desirable to shear the stump 22 below ground thereby leaving a small ground pocket that is easily filled.

It will also be apparent to those skilled in the art that the hydraulic cylinders 56 and 84 are operable simultaneously as are the hydraulic cylinders 102 and 104.

The extracted stump as shown most clearly in FIG. 7 is cradled between the shearing arms 44 and 70, the spline members 24, 26, 28 and 30, and the end portion 188 of the column 16. While the hydraulic cylinders 56, 84, 102 and 104 are protracted, the derrick raises the derrick arms 12 to transfer the extracted tree stump 22, free of the lateral and tap root portions, to a load vehicle (not shown) which will deliver the extracted stump for further processing.

In another embodiment of the invention, a tree stump extractor is generally indicated by the reference number 200 in FIG. 8. The extractor 200 differs from the extractor 10 only in the provision of cutter blades 202 and 204 (FIG. 9) that include respective recesses 206 and 208. The extractor 200 is otherwise identical to the extractor 10. However, due to the recesses 206 and 208 in the cutting surfaces 202 and 204, the tap root of a tree stump 210 will not be completely sheared in the lateral direction but will remain intact in an area designated 212 in FIG. 9.

Figure 10:
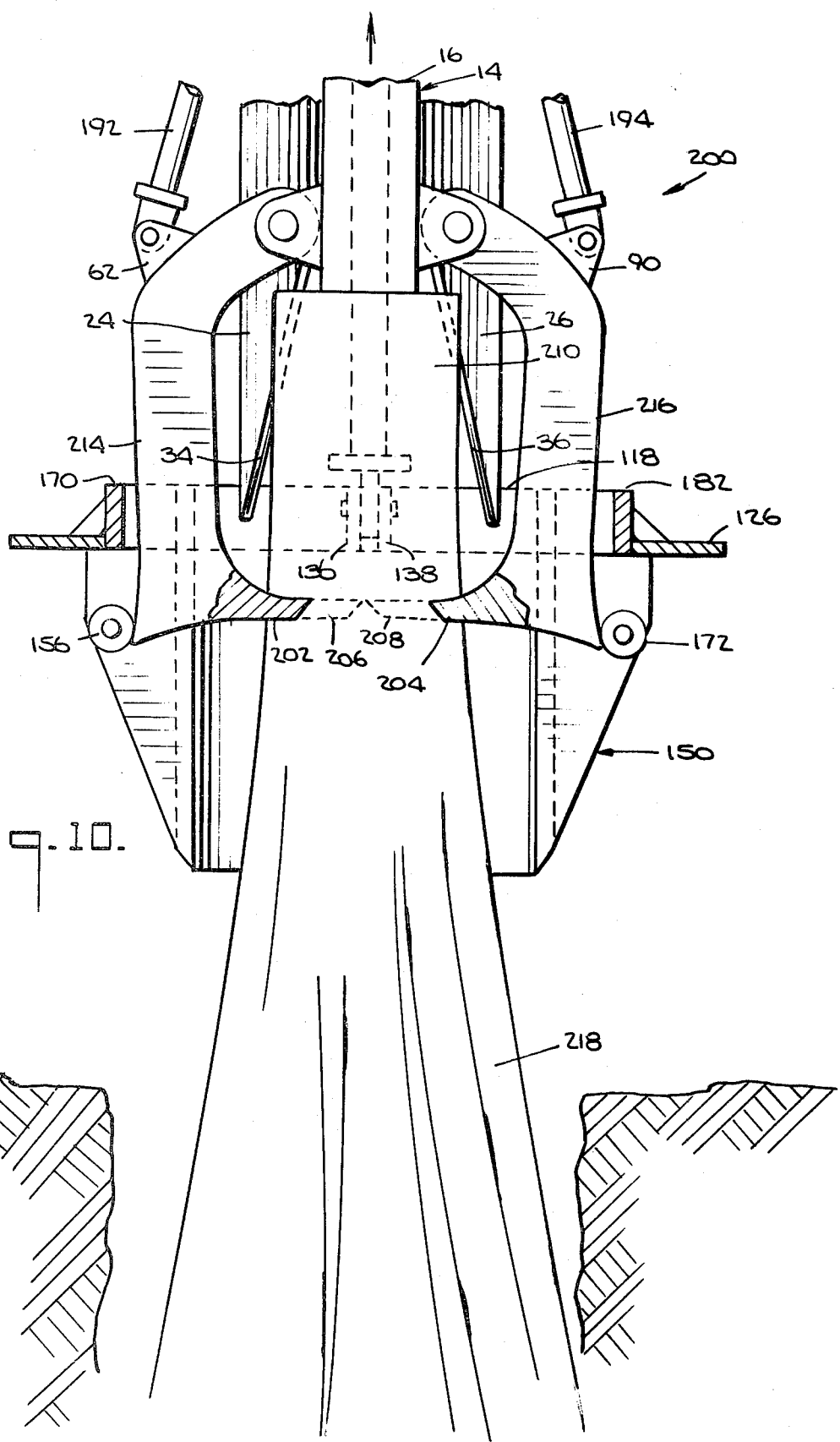
FIG. 10 is an elevational view thereof showing the tree stump as well as the root section being removed from the ground.

Consequently when the derrick raises the derrick arms 12 after the shearing arms 214 and 216 (corresponding to the shearing arms 64 and 82 of the extractor 10) have been placed in their second limit position the extractor 200 will maintain a grip of sufficient predetermined magnitude around the tree stump 210 to draw the stump and the tap root portion 218 (FIG. 10) from the ground. The lateral root, however, will be cut in the ground by the annular cutter portion 150.

Some advantages of the present invention evident from the foregoing description include a tree stump extractor that removes a tree stump from the ground while leaving the roots in place, a tree stump extractor that simultaneously shears the tap root and lateral root below the ground while extracting the stump from the ground. A further advantage is the clean cutting operation which leaves a relatively small opening at the site of the removed stump. Still another advantage is the provision of means for providing cumulative forces on a shearing member to optimize the power provided by the hydraulic cylinder.

In view of the above it will be seen that the several objects of the invention are achieved and other advantageous results attained.

As various changes could be made in the above constructions without departing from the scope of the invention, it is intended that all matter contained in the above description or shown in the accompanying drawings shall be interpreted as illustrative and not in a limiting sense.

What is claimed is:

1. A tree stump extractor comprising, a frame including locating means for locating said frame in a predetermined position on a tree stump, shearing means pivotable with respect to said frame for movement from a first limit position relative to said frame to a second limit position relative to said frame, first actuating means connected to said frame and said shearing means for pivoting said shearing means relative to said frame, and thrust means moveable with respect to said frame in a first direction for engagement with said shearing means to urge said shearing means to move toward said second limit position.

2. A tree stump extractor as claimed in claim 1, wherein said thrust means includes a substantially annular cutter portion and said locating means comprise means for centering said cutter portion so as to be substantially concentric with said tree stump.

3. The tree stump extractor as claimed in claim 2, wherein said frame comprises an elongated column member and said annular cutter portion is substantially concentric to said column member, said centering means including a tapered surface extending from said column member, said tapered surface diverging away from said column member as it extends in said first direction.

4. The tree stump extractor as claimed in claim 3, wherein said centering means include a spline member affixed to said column member and depending from said column member in said first direction, said spline member having said tapered surface.

5. The tree stump extractor as claimed in claim 4, wherein said column member has a peripheral portion and said centering means include a plurality of said spline members along the peripheral portion of said column member.

6. The tree stump extractor as claimed in claim 5, wherein said plurality of spline members include oppositely disposed cooperative spline member pairs, each said oppositely disposed cooperative pair of spline members having tapered surfaces with a common vertex.

7. The tree stump extractor as claimed in claim 6, wherein the common vertices of said oppositely disposed cooperative pairs of spline members originate from a common point.

8. The tree stump extractor as claimed in claim 2, wherein said annular cutter portion has an inner diameter that permits said annular cutter portion to encircle said centering means.

9. The tree stump extractor as claimed in claim 1, wherein said shearing means include a pair of shearing members pivoted to said frame, each said shearing member having a respective cutting surface.

10. The tree stump extractor as claimed in claim 9, wherein said cutting surfaces are directed substantially parallel to said first direction when said shearing members are in said first limit position and said cutting surfaces are directed at an angle to said first direction when said shearing members are in said second limit position.

11. The tree stump extractor as claimed in claim 10, wherein said cutting surfaces are substantially perpendicular to said first direction when said shearing members are in said second limit position.

12. The tree stump extractor as claimed in claim 9, wherein said first actuating means comprise a cylinder member for each of said shearing members.

13. The tree stump extractor as claimed in claim 12, wherein said cylinder members have a retracted position corresponding to the first limit position of said shearing members and a protracted position corresponding to the second limit position of said shearing members.

14. The tree stump extractor as claimed in claim 10, wherein said cutting surfaces are next to each other when said shearing members are in said second limit position.

15. The tree stump extractor as claimed in claim 14, wherein a space is defined between said shearing members in said second limit position and said locating means for holding an extracted stump.

16. The tree stump extractor as claimed in claim 9, wherein said shearing members each include an arm portion, said shearing members being pivoted to said frame at the respective arm portions, and wherein said thrust means comprise respective engagement members engageable with each of the arm portions to pivot said shearing members toward said second limit position when said thrust means is moved in said first direction.

17. The tree stump extractor as claimed in claim 16, including second actuating means connected to said frame and said thrust means for moving said thrust means in said first direction.

18. The tree stump extractor as claimed in claim 16, wherein said arm portions include respective cam surfaces and said respective engagement members each comprise a cam follower.

19. The tree stump extractor as claimed in claim 18, wherein each of said cam followers comprise a roller member.

20. The tree stump extractor as claimed in claim 18, wherein the lateral distance between said cam followers is fixed and said arm portions extend laterally beyond said cam followers when said shearing members are in said first limit position such that movement of said thrust means in said first direction causes said cam followers to engage said cam surfaces and pivot said arm members toward said second limit position.

21. The tree stump extractor as claimed in claim 1, wherein said thrust means comprise a substantially annular member having an inner periphery for accommodating said frame and said locating means.

22. The tree stump extractor as claimed in claim 21, including second actuating means connected to said frame and said annular member for moving said annular member in said first direction.

23. The tree stump extractor as claimed in claim 21, wherein said substantially annular member includes depending cutter portions for cutting along a substantially circular path.

24. The tree stump extractor as claimed in claim 22, wherein said second actuating means comprise a pair of oppositely disposed cylinders connected to said frame and said annular member.

25. The tree stump extractor as claimed in claim 22, wherein said annular member is moveable from an ascended limit position to a descended limit position, said descended limit position corresponding to the second limit position of said shearing means.

26. The tree stump extractor as claimed in claim 24, wherein said oppositely disposed cylinders have a retracted position corresponding to an ascended limit position of said annular member and a protracted position corresponding to a descended limit position of said annular member, said descended limit position corresponding to the second limit position of said shearing means.

27. The tree stump extractor as claimed in claim 26, wherein said shearing means include a pair of shearing members pivoted to said frame and said shearing members each include an arm portion, said shearing members being pivoted to said frame at the respective arm portions, said arm portions including respective cam surfaces and said respective engagement members each comprise a cam follower fixed to said annular member for engagement with the cam surfaces of each of said arm portions to pivot said shearing members into said second limit position when said annular member is moved by said oppositely disposed cylinders from said ascended limit position to said descended limit position.

28. The tree stump extractor as claimed in claim 21, wherein said annular member includes a substantially peripheral flange extending generally perpendicular to said first direction.

29. The tree stump extractor as claimed in claim 9, wherein at least one of said cutting surfaces include a recess to permit incomplete shearing of said tree stump when said shearing members are in said second limit position.

30. The tree stump extractor as claimed in claim 14, wherein said cutting surfaces are in substantial line to line contact when said shearing members are in said second limit position.

31. A tree stump extractor comprising an elongated support member, a pair of oppositely disposed shearing members pivoted to said support member for cutting in a lateral direction with respect to said support member, a thrust member moveably connected to said support member having a depending annular cutting portion for cutting in a predetermined longitudinal direction with respect to said support member, a first pair of actuating members respectively connected to said support member and said shearing members for pivotally moving said shearing members toward and away from each other, said shearing members cutting in a lateral direction when moved toward each other, and a second pair of actuating members respectively connected to said support member and said thrust member for moving said thrust member in said predetermined longitudinal direction.

32. The tree stump extractor as claimed in claim 31, wherein said thrust member includes a pair of engagement members respectively engageable with said shearing members for pivotally moving said shearing members toward each other while said second actuating members move said thrust member in said predetermined longitudinal direction whereby the pivotal force of said thrust member on said shearing members and the pivotal force of said first pair of actuating members on said shearing members is cumulative.

33. A method for extracting the stump of a tree from the ground, the tree stump containing lateral roots and a tap root, comprising locating annular cutter means around the periphery of the tree stump in a position substantially coaxial with the axis of the tree stump, forceably moving lateral cutter means from a position above the ground into the ground to laterally shear the tap root below ground, forceably moving the annular cutter means longitudinally of the tree stump into the ground to shear the lateral roots in the ground and lifting the tree stump from the ground whereby it is extracted without the tap root and the lateral roots.

34. The method according to claim 33, including applying the moving force of the annular cutter means to the lateral cutter means.

35. The method according to claim 33, wherein the lateral cutter means is pivoted into the ground simultaneously while the annular cutter means is moved longitudinally into the ground.

36. The method according to claim 33, wherein the longitudinal force of the annular cutter means is applied to the lateral cutter means to influence the pivotal movement of the lateral cutter means.

37. The method according to claim 36, wherein the lateral cutter means is forceably moved independently of the annular cutter means and the application of the longitudinal force of the annular cutter means to the lateral cutter means is in addition to the independent force of the lateral cutter means.

* * * * *